Patented Oct. 9, 1934

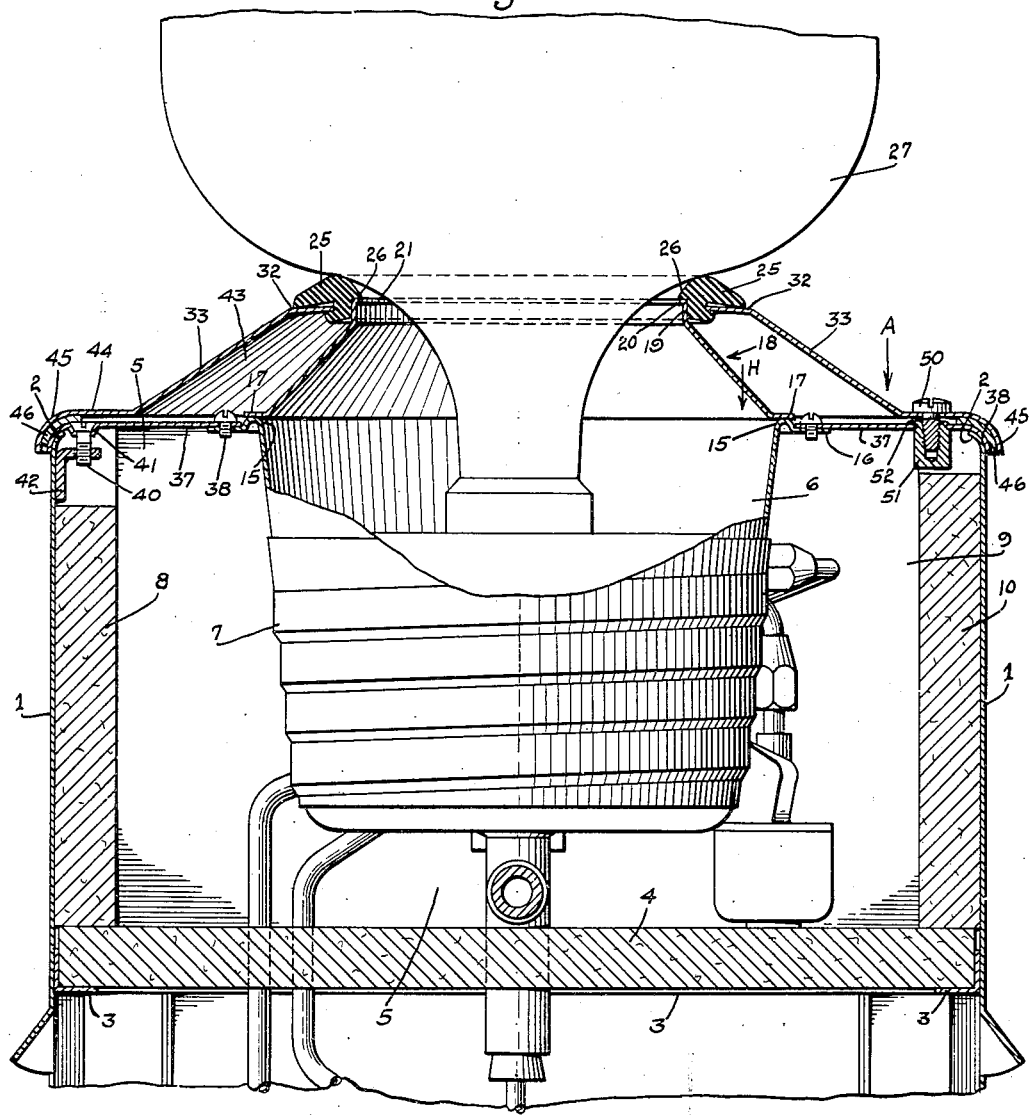
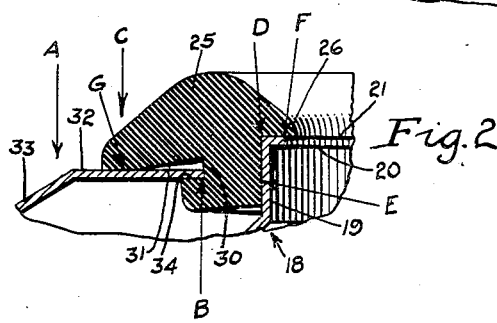

1,976,008

UNITED STATES PATENT OFFICE 1,976,008

INSULATING DEVICE

Harry E. Cullen and Henry O. Ronning, Minneapolis, Minn., assignors to Henry P. Watson, Minneapolis, Minn.; Alfred F. Pillsbury and Bessie Watson executors of said Henry P. Watson, deceased Application March 13, 1933, Serial No. 660,510
Renewed March 31, 1934

10 Claims. (Cl. 62—141)

This invention relates to improvements in means for insulating the receptacles of drinking water coolers and dispensers and the like, and is particularly concerned with a structure for substantially reducing conduction of heat to water which has been refrigerated.

The invention is herein applied to a type of water cooling and dispensing apparatus shown in our copending application for Water coolers, Serial Number 631,539, but it is understood that there is no intention to limit the invention to any particular type of apparatus.

Objects are: To provide an improved structure for heat insulating a water cooler reservoir; to provide cover means for such a reservoir comprising elements which cooperate to form a dead air chamber to resist conduction of heat to the water receptacle and to an insulating chamber containing said receptacle; to utilize the cover elements to secure a water bottle gasket in operative position; to provide a structure in which certain of the elements are caused to assume a sealed relation as the result of movement of one of the elements to operative position; to provide a structure which can be easily assembled and disassembled; and generally to provide an efficient device for all the purposes disclosed herein.

Features of the invention include all the details of construction, as well as the assembly arrangement of the parts, along with the broader ideas of means inherent in the disclosure.

Objects, features and advantages of the invention will be set forth in the description of the drawing forming a part of this application, and in said drawing Figure 1 is a vertical section illustrating the invention applied in a water cooling and dispensing apparatus; and Figure 2 is a detail section illustrating the clamping action on the bottle-supporting annulus.

In this instance, the outer casing is indicated at 1 and is formed of sheet metal having the upper periphery turned inwardly as at 2 to form a curved flange. Angle irons 3 are attached to the casing to provide a shelf and upon the shelf is placed a slab 4 of heat insulating material, which constitutes the bottom member of an upper chamber 5 having therein an open-top water dispensing receptacle 6. Suitable means generally indicated at 7 is provided for circulating a refrigerant around the outside of the receptacle, and some of the connections for controlling refrigeration are indicated, but not described, since they form no part of the present invention. Other heat insulating elements forming chamber 5 are indicated at 8, 9, 10. Usually packing, not shown, is provided between this heat insulating material and the receptacle 6.

The rim of the receptacle 6 has the form of an upwardly convex bead indicated at 15, and this bead merges into an outwardly directed horizontal flange 16. Resting upon the bead is the horizontal bottom flange 17 of a conical annulus generally indicated at 18, which annulus is upwardly convergent and has an upper vertical cylindrical portion 19 terminating in a slight inwardly directed horizontal flange 20 defining an opening 21.

On the outer side of the vertical cylindrical wall 19 is a rubber annulus the body of which is indicated at 25. This rubber annulus is provided with a flange 26 which overlies the flange 20, defines an opening throught which the bottle neck projects, and projects inwardly beyond the flange 20. The bottle is indicated at 27 and rests upon the upper surface of the annulus. By the use of the flange 26, the movement of the annulus toward the receptacle is prevented, and this flange also provides a cushion for the bottle.

The annulus has a horizontal peripheral groove 30 at its outer face, the upper wall of the groove being extended as at 31 a substantial distance outwardly to overlie and sealingly engage the flat upper horizontal flange 32 of an upwardly convergent conical annulus 33. This flange projects into and also sealingly engages the bottom or shoulder portion 34 of the groove. The annulus can, therefore, be easily assembled by what may be considered a buttoning process. The lower wall of the groove forms a shoulder to which force is applied, to swing the outer portion of the annulus in a manner to be described.

Resting upon the flange 16 of the receptacle 6 is a plate annulus 37 which has a flange 38 curved to conform to the configuration of and sealingly fit the flange 2, and fitting there-over as a lid. This annulus 37 forms a cover for that portion of the chamber 5 lying between the walls 1 and the receptacle 6. The plate 37 is secured to the flange 16 by suitable fastening devices 38 such as screws, and the plate 37 is secured to the casing 1 by means of screws 40 having their heads in suitable punched sockets 41 of the plate. The screws engage openings in brackets 42 attached to the inner faces of the walls 1. The insulating slabs are recessed to receive the brackets. Only one of these fastening devices has been shown but it will be understood that a suitable number are provided.

The elements 15, 17, 25, 33 and 37 cooperate to provide a circumscribing dead air space indicated at 43. The annulus 33, has a lower flange having a horizontal flat portion 44, and a marginally downwardly curved portion 45, conforming to the configuration of a gasket 46 which rests on plate 37.

A valuable feature of this invention is the arrangement whereby when the annulus 33 is moved in direction of the arrow A, the flange 32 acts at point B upon the shoulder of the gasket to swing the gasket in direction of the arrow C about point D as a center to obtain compression sealing at points B, E, F, G, and at the same time to move the conical member 18 in direction of the arrow H to press the flange 17 against the bead 15 to obtain a circumferential sealing line contact between these elements. At the same time, portion 45 of annulus 33 is sealingly pressed against the packing 46.

To move element 33, screws 50 are threaded into a member 51 suitably secured as at 52 to plate 37. Although only one of the clamping devices is shown, it will be understood that a suitable number are employed.

It is noted that the heads of the screws 50 do not necessarily have to have screw slots, because the screws may be operated by thumb.

The flange 17 is so designed that it has a certain amount of resiliency so that it can be flexed, and when element 18 is pressed downwardly the flange is slightly flexed, to obtain sealing line contact, with the top of the bead 15 or with the rim of the receptacle, whatever its formation.

All the elements or devices can be stamped or pressed from sheet metal and can be easily and quickly assembled or disassembled.

It will be understood that certain modifications can be made in the structure without departing from the spirit of the invention, and there is no intention to be limited only to the specific shapes of the members shown. It is conceivable that plate 37 may be dispensed with, and that elements 18, 25 and 33 only will be used. It is believed that the idea of clamping the rubber annulus by a lever-like action, as well as moving element 18 against the receptacle 6, by means of an element the equivalent in action of 33, are particularly valuable features.

We claim as our invention:

1. An insulating chamber having a receptacle therein open at the top, a first annulus having a flange sealingly circumferentially engaging the rim of the receptacle and being resiliently flexible, an annular gasket sealingly fitting the first annulus, a second annulus spaced from the first, said gasket and second annulus having means cooperative to cause the gasket to sealingly engage the first and second annuli when the second annulus is moved in a direction toward the first, and means by which the second annulus is moved for the aforesaid purpose to sealingly engage the wall of the chamber.

2. An insulating chamber having an open top receptacle therein, a first annulus sealingly engaging the rim of the receptacle, an annular compressibly resilient gasket sealingly fitting on the outside of the first annulus and projecting outwardly therebeyond and having means to prevent translation in a direction towards the receptacle, a second annulus spaced from the first, and engaged on the outer side by said gasket, said second annulus and gasket having means cooperative to cause the gasket to swing about the first annulus as a center toward the receptacle when the second annulus is moved toward the receptacle, and means to move the second annulus toward and secure it in sealed relation with the chamber.

3. An insulated chamber having an open top receptacle therein, a first annulus sealingly engaging the rim of the receptacle, an annular compressibly resilient gasket sealingly fitting on the outside of the first annulus and having means to prevent it from being slid therealong in a direction towards the receptacle, and having a shoulder at that side opposed to the receptacle with a portion of the annulus overlying and extending outwardly beyond the shoulder, and a second annulus spaced from the first and engaging with the shoulder, and engaged by said overlying portion, and means acting on the second annulus in a direction axially of the receptacle to obtain a seal between it and the chamber.

4. An insulated chamber, a receptacle in the chamber having a rim in the form of a bead and a circumferential flange extending outwardly beyond the bead, a first annulus sealingly secured to the flange and chamber, to cover the chamber, a second annulus having a circumferential flange bearing on the bead, an annular gasket held by the second annulus in a manner to support an inverted bottle for delivery of its contents into the receptacle, a third annulus spaced from the other two to form a dead air space and engaging the gasket to secure it, and in sealing engagement with the first annulus, and means acting on the third annulus is a direction axially of the receptacle to obtain a seal between it and the first annulus.

5. A chamber having a receptacle therein, said receptacle having a rim having an upwardly convex surface merging into a lower horizontal flange which extends outwardly from the bead, an annular plate covering the receptacle and sealingly connecting with the flange, a conical annulus having a flange having a sealing line contact with the convex surface of the rim and having a cylindrical portion at its top, an annular rubber gasket sealingly fitting the cylindrical portion and having means to prevent translation toward the receptacle and having a circumferential groove in its lateral face with the upper wall of the groove extended a substantial distance outwardly beyond the lower wall of the groove, an annular plate opposed to the chamber and receptacle and having an opening the edge of which is engaged and against the outer side of which the extended portion of the annulus engages, and forming with the conical annulus and with the first mentioned plate a dead air space, and means for drawing the last mentioned member toward and securing it in sealed relation with the annular plate to obtain compression sealing action.

6. An insulated chamber having an open top receptacle therein, having a rim which is upwardly convex and which merges into a horizontal flange which lies below the plane of the crown of the rim, a first annulus having a flange sealingly engaging the crown of the rim, an annular compressibly resilient gasket sealingly fitting on the outside of the first annulus and projecting outwardly therebeyond, means to prevent translation of said gasket in a direction toward the receptacle, a second annulus spaced from the first and engaged on the outer side by said gasket, said second annulus, and gasket having means cooperating to cause the gasket to swing about the first annulus as a center toward the receptacle, when the second annulus is moved toward the receptacle, and means for drawing the second annulus toward the first and securing it in sealed relation therewith to obtain compression sealing action.

7. An insulated chamber having an open top receptacle therein, having a rim which is upwardly convex and which merges into a horizontal flange which lies below the plane of the crown of the rim, a first annulus sealingly engaged with the flange and chamber, a second annulus having a flange sealingly engaging the crown of the rim, an annular compressibly resilient gasket sealingly fitting on the outside of the first annulus and projecting outwardly therebeyond, means to prevent translation in a direction toward the receptacle, a third annulus spaced from the first and second and engaged on the outer side by said gasket, said third annulus and gasket having means co-operating to cause the gasket to swing about the first annulus as a center toward the receptacle when the third annulus is moved toward the receptacle, and means for drawing the third annulus toward the first and securing it in sealed relation therewith.

8. A chamber having a receptacle therein, said receptacle having a beaded rim merging into a horizontal flange extending outwardly from the rim, an annular plate sealingly engaging the receptacle and chamber, a first annulus sealingly engaging the rim of the receptacle and having a cylindrical portion, an annular rubber gasket fitted around the cylindrical portion and having means engaged with the first annulus to prevent translation toward the receptacle, and further having a circumferential groove in its lateral face with the upper wall of the groove extended a substantial distance outwardly beyond the groove, and engaging the upper face of the first annulus, a second annulus having an opening with the edge of the opening engaged in the groove and the extended portion of the annulus resting on its outer side, and forming with the first annulus and annular plate a dead air space, and means for drawing the second annulus toward and sealingly against said plate.

9. An insulating chamber having a receptacle therein, means forming a dead air space over the chamber and receptacle, including a first annulus sealingly engaging the receptacle, an annular gasket sealingly fitting the first annulus, a second annulus spaced from the first, said annuli and gasket having means cooperative to cause the gasket to swing and assume a sealed relation when the second annulus is moved toward the first, and means by which the second annulus is moved for the aforesaid purpose to assume a sealed relation with the wall of the chamber.

10. A structure providing a chamber having a receptacle, means forming a dead air space to reduce heat conduction to the chamber and receptacle including, a first annulus sealingly associated with the receptacle, an annular gasket on said first annulus adapted to support an inverted bottle having its neck delivering into the receptacle, a second annulus spaced from the first and in sealed relation with gasket and structure, said annuli and gasket having means cooperative to cause the gasket to swing about the annuli as fulcra to compressively sealed relation when the second annulus is moved toward the receptacle and means for drawing the second annulus toward the first and securing it in compressively sealed relation with the structure.

HARRY E. CULLEN.
HENRY O. RONNING.